INVENTOR.
KENNETH C. D. HICKMAN

Dec. 18, 1951     K. C. D. HICKMAN     2,578,999
VACUUM DISTILLATION APPARATUS
Filed April 14, 1948     4 Sheets-Sheet 2

INVENTOR.
KENNETH C. D. HICKMAN
ATTORNEYS

Dec. 18, 1951     K. C. D. HICKMAN     2,578,999
VACUUM DISTILLATION APPARATUS
Filed April 14, 1948                                4 Sheets-Sheet 3
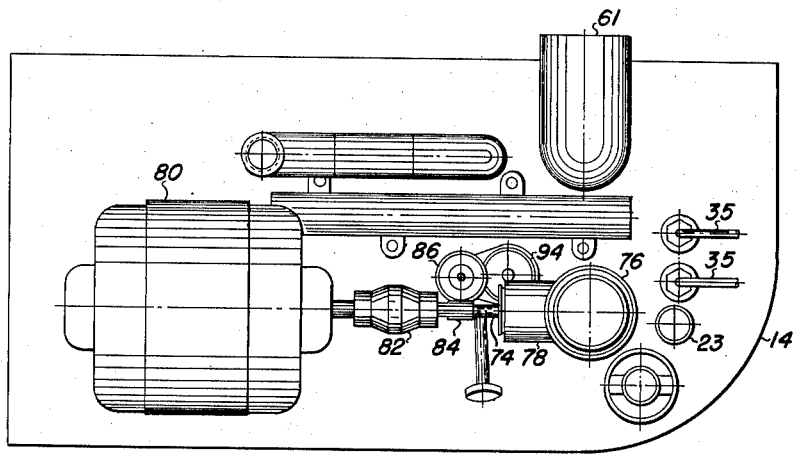
FIG. 4
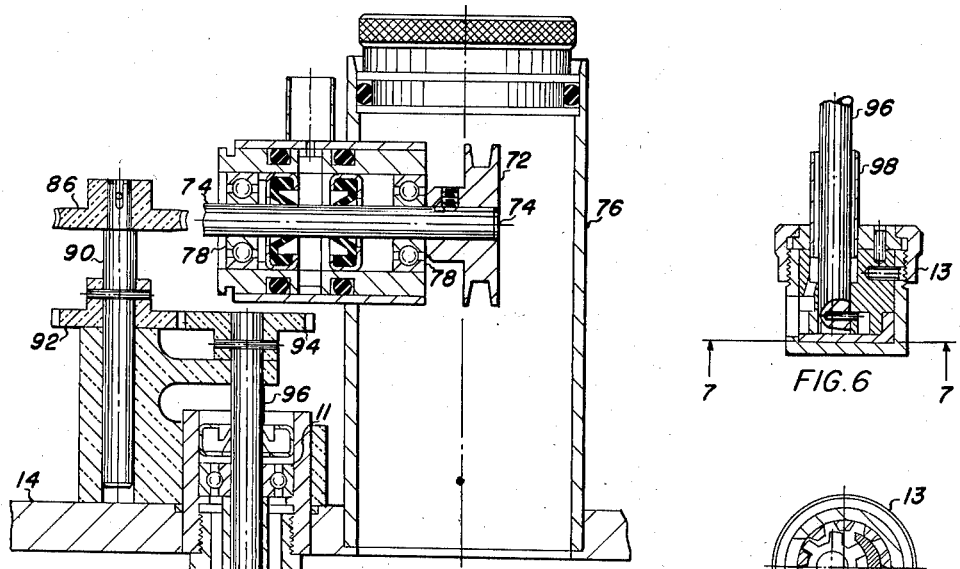
FIG. 5         FIG. 6
FIG. 7
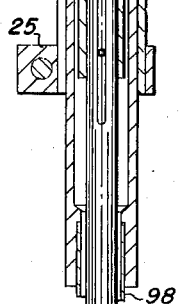
INVENTOR.
KENNETH C. D. HICKMAN
BY Hoke S. Woodruff
Allard A. Braddock
ATTORNEYS Patented Dec. 18, 1951

2,578,999

UNITED STATES PATENT OFFICE 2,578,999

VACUUM DISTILLATION APPARATUS

Kenneth C. D. Hickman, Rochester, N. Y., assignor, by mesne assignments, to Eastman Kodak Company, Rochester, N. Y., a corporation of New Jersey Application April 14, 1948, Serial No. 20,977

5 Claims. (Cl. 202—205)

This invention relates to vacuum distillation apparatus and especially to high-vacuum unobstructed-path distillation apparatus embodying a centrifugal evaporator.

It is a principal object of the invention to provide simplified vacuum distillation apparatus of the centrifugal type which shall be substantially less expensive than such apparatus heretofore available while at the same time retaining all functions essential to effective distillation.

It is a further object of the invention to provide more compact and more efficient vacuum distillation apparatus of the centrifugal type.

Another object is to simplify high-vacuum unobstructed-path distillation apparatus and processes employing centrifugal evaporators by eliminating the necessity for external reservoirs for distilland with their concomitant extra cost and attendant multiplicity of conduits extending through the walls of the vacuum chamber.

It is a further object of the invention to provide a self-contained unit comprising all the essential elements of a centrifugal high-vacuum still while avoiding in large measure complex and expensive structural features.

The invention also aims to provide novel distillation apparatus of the high-vacuum unobstructed-path type employing a centrifugal evaporator in which distilland is stored, distilled, and condensed all within a single vacuum chamber.

More specifically, the invention aims to provide such apparatus in which the walls of the vacuum chamber itself provide a reservoir for distilland within the chamber.

A further specific object of the invention is to minimize the number of joints in the vacuum chamber of a high-vacuum centrifugal still and thereby to minimize danger of leakage.

The invention further aims to provide a more efficient heating arrangement for centrifugal evaporators in vacuum distillation apparatus.

A further specific object of the invention is to provide a compact and readily portable unit efficiently combining in a self-contained structure apparatus for effectively carrying out molecular distillation operations on a small scale and which shall be especially adapted for laboratory and experimental use.

The invention further aims to provide novel distillation apparatus capable of being disassembled for cleaning with a minimum of time and effort.

A further specific aspect of the invention aims to provide such apparatus designed for ready cleaning between successive runs by a simple removal of a single bell jar member forming the vacuum chamber and without disturbing the rest of the apparatus.

The invention further aims to provide simple and effective control means for vacuum distillation apparatus.

More generally, the invention aims to provide simple, economical, and efficient procedures and apparatus for high-vacuum distillation employing a centrifugal evaporator and an opposed condensing surface separated from the evaporator by substantially unobstructed space and particularly to provide such apparatus which shall be neat, compact, readily constructed, readily assembled, and readily disassembled.

The manner in which these and other objects of the invention are attained will be apparent from the following description taken in conjunction with the accompanying drawings and the appended claims.

In the accompanying drawings:

Fig. 4 is a top view of the apparatus of Figs. 1 and 2.

Fig. 5 is an enlarged fragmentary front view partially in section showing the driving means for the pump and rotor.

Fig. 6 is a view partially in section of the pump.

Fig. 7 is a sectional view taken along line 7—7 of Fig. 6.

Figure 1:
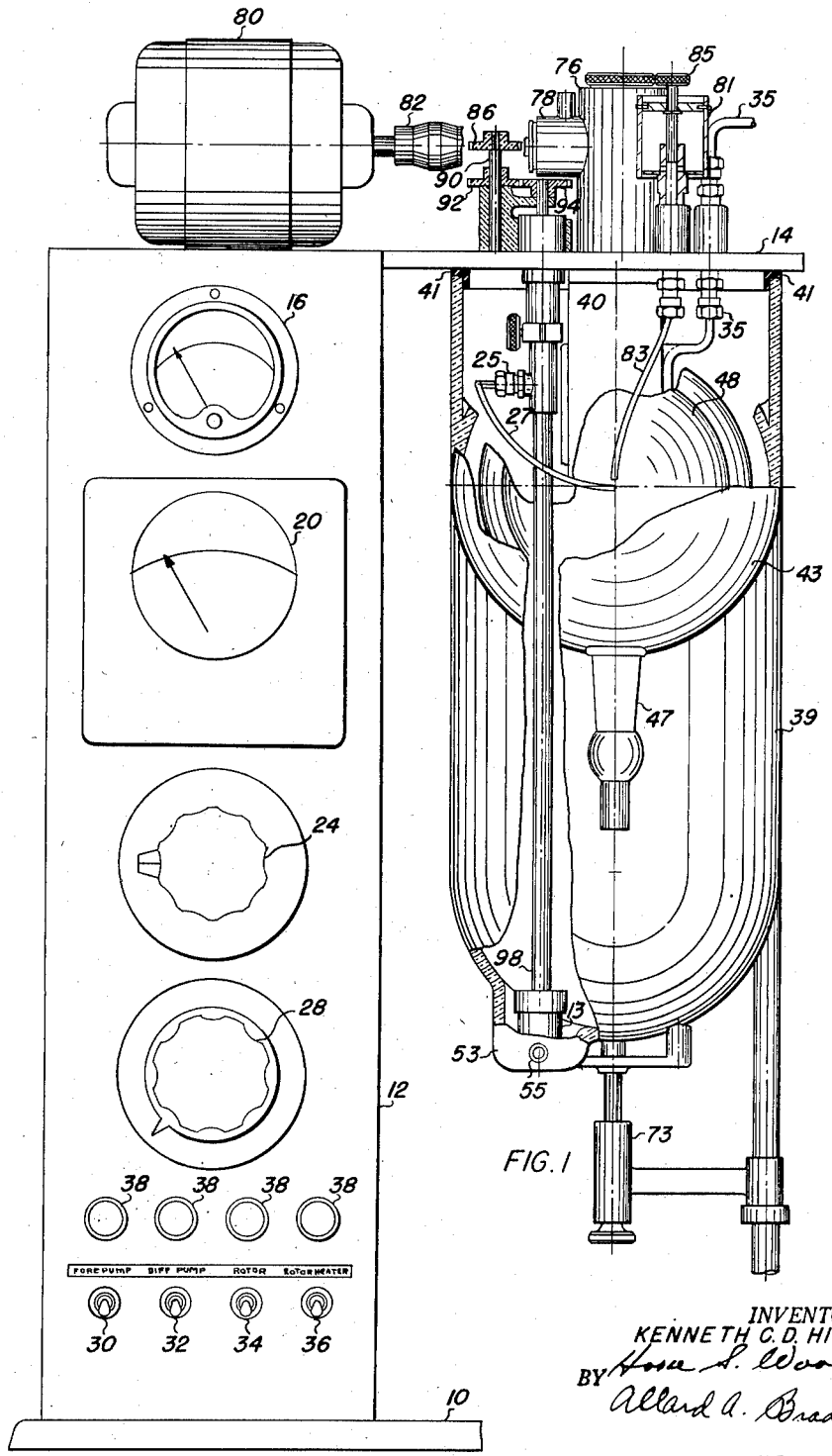
Fig. 1 represents a partially broken and partial cross-sectional front view of apparatus embodying the present invention in a preferred form.
Figure 2:
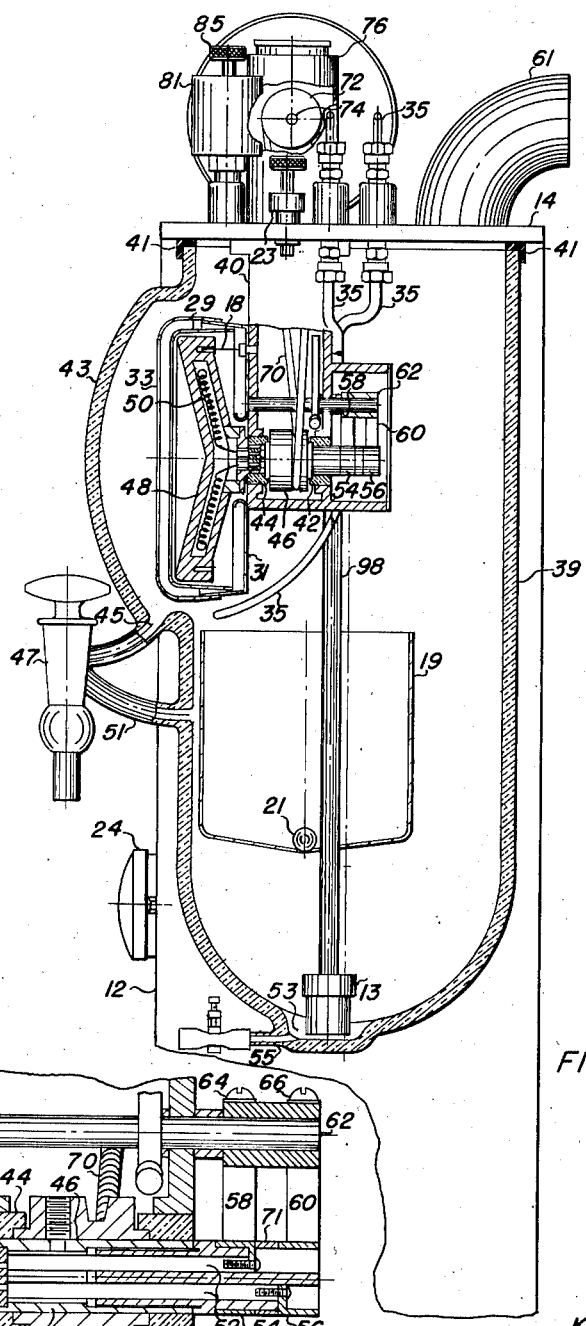
Fig. 2 is a partially broken and partial cross-sectional side view of the apparatus of Fig. 1.
Figure 3:
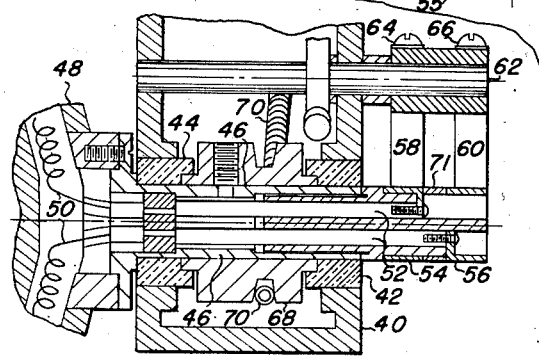
Fig. 3 is an enlarged sectional view of the commutator apparatus of Fig. 2.
Figure 8:
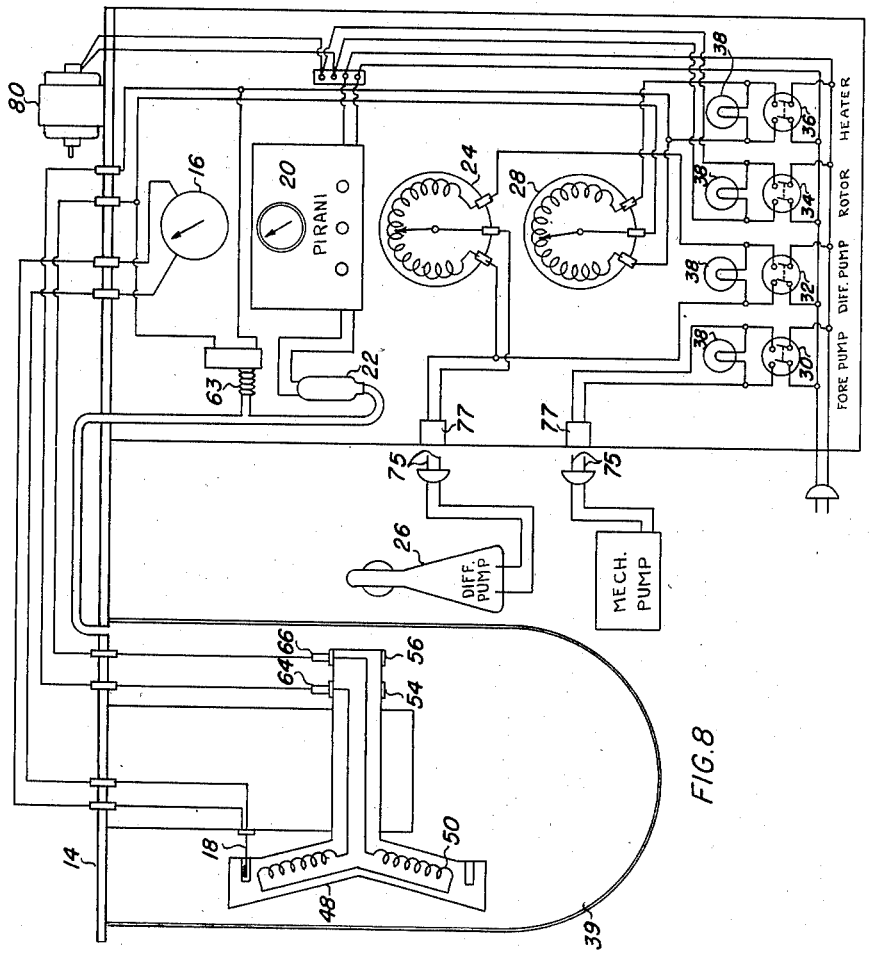
Fig. 8 is a wiring diagram of the apparatus.

Referring to the drawings, numeral 10 designates a base support for the apparatus. Control panel 12 is rigidly attached to base support 10. Baseplate 14 extends beyond control panel 12 and is held rigidly in position by the housing of control panel 12. Milliammeter 16 on control panel 12 is connected to thermocouple 18 and is used to determine the temperature of the rotor. Meter 20 on control panel 12 is connected to Pirani tube 22 (Fig. 8) in the vacuum chamber and is used to determine pressure. Autotransformer control 24 on control panel 12 is used to vary the heat in diffusion pump 26 (Fig. 8). Autotransformer control 28 on control panel 12 is used to vary the current flowing in the rotor heating element. Control switches 30, 32, 34, and 36 on control panel 12 operate respectively the mechanical fore pump, the diffusion pump, the rotor, and the rotor heater. Each of pilot lights 38 on control panel 12 lights up when the control switch in its circuit is turned on.

Baseplate 14 supports all of the operating parts of the apparatus except the evacuating system which is not shown. Controls for the diffusion pump and fore pump are placed on control panel 12 for the sake of convenience.

Extending downward from baseplate 14 is a rigid hollow metal post 40. Post 40 supports bearings 42 and 44 through which hollow shaft 46 of the rotor commutator passes. Rotor 48 is attached to hollow shaft 46. Rotor 48 is hollow and contains an embedded heating element 50 which is integral therewith and which rotates with rotor 48. Leads 52 from heating element 50 pass through hollow shaft 46 to slip rings 54 and 56 between which there is provided insulating material 71. Contact with slip rings 54 and 56 is made by metal strips 58 and 60 which are fastened to a piece of nonconducting fibrous material designated as numeral 62. Metal strips 58 and 60 are attached to terminals 64 and 66. These leads are connected to autotransformer 28. By embedding the heating element in the rotor, variations in temperature between the vaporizing surface and the reverse face of the rotor are minimized with the result that objectionable carbonization heretofore encountered on the reverse face is substantially reduced if not entirely eliminated. However, if this feature should be considered unnecessary, the heating element need not be embedded in the rotor. If placed behind the rotor it will function as a radiant heater.

Pulley 68 is rigidly attached to hollow shaft 46. Spring belt 70 drives pulley 68. Spring belt 70 is impelled by pulley 72 which is attached to shaft 74 at a point near the top of the interior of gas-tight turret 76 on top of baseplate 14. A bevel gear drive or worm gear drive or other suitable, mechanical drive may be used in place of the belt drive shown. Shaft 74 passes through gas-tight bearing 78 to the outside of the vacuum chamber where it is connected to motor 80 by means of flexible coupling 82.

Worm 84 is attached to shaft 74 and serves to rotate gear 86 which rotates shaft 90 to which gear 92 is rigidly attached. Gear 86 is easily removable and may be replaced by a different size of gear where it is desired to change the speed of rotation of shaft 90. Gear 92 meshes with gear 94 on shaft 96 which rotates inside housing 98 through gas-tight bearing 11. Gear pump 13 is attached to the base of housing 98 and serves to lift distilland to the level of rotor 48. Gears 15 and 17 of pump 13 are actuated by shaft 96. Other pumping arrangements such as a centrifugal pump or chain hoist may be used in place of gear pump 13.

A small receptacle 19 is attached to housing 98. Receptacle 19 serves as a pickup for undistilled residue. It may be emptied into the bottom of bell jar 39 by lifting ball 21 which is attached to pull-up control means 23 by a fine wire (not shown). If desired, a second receptacle may be placed below receptacle 19 and pump 13 may be designed to pump from this receptacle rather than the bottom of bell jar 39.

When pump 13 is in operation, distilland is forced upward through the annular space between housing 98 and rotating shaft 96 until it reaches T-connection 25 at a point just above rotor 48. Feed conduit 27 leads from T-connection 25 to the approximate center of rotor 48.

Receptacle 81, located on the upper side of baseplate 14, communicates with conduit 83 which feeds onto the center of rotor 48. Receptacle 81 may be closed by actuating screw clamp 85.

In operation, receptacle 81 is used when it is desired to employ the apparatus as a degasser. Liquid fed into receptacle 81 passes directly to rotor 48 where it is degassed, the residue passing to receptacle 19 where it may be held in readiness for further treatment.

Surrounding the periphery of rotor 48 are annular baffles or gutters 29, 31, and 33. These baffles serve to collect and guide undistilled residue from rotor 48 to receptacle 19, the residue being picked up by gutter 29, from which it flows by gravity to gutter 31, thence to gutter 33, and from there to receptacle 19. In passing from gutter 33 to receptacle 19, the residue may be cooled by contact with cooling pipe 35. Cooling pipe 35 enters the system through baseplate 14 and makes a single pass down one side of metal post 40, then curves over to a point under the spillway of gutter 33, then returns and passes up the other side of metal post 40. In this way cooling pipe 35 not only cools the residue passing to receptacle 19 but also cools bearings 42 and 44.

Extending downward from baseplate 14 and entirely surrounding pump 13, receptacle 19, and rotor 48, is removable bell jar 39 formed of rigid material such as fairly heavy glass. In the event transparency for observation purposes is not desired, the bell jar may be formed of metal or other suitable material. Bell jar 39, which is supported by adjustable clamp member 73, makes gas-tight connection with baseplate 14 through gasket 41. Slightly bulbous surface 43 of bell jar 39 serves as a condensing surface. At the bottom of bulbous surface 43 is collecting gutter 45 which picks up condensed distillate. Condensed distillate may be drawn off through stopcock 47 or may be returned to the distilland as reflux through return pipe 51.

The bottom of bell jar 39 has sump 53 to contain pump 13. Distilland may be introduced to this sump through conduit 55.

Bell jar 39 may be evacuated by pumping means (not shown) connected with conduit 61 which opens into the vacuum chamber through the plate 14. Microswitch 63 (Fig. 8) prevents the circuit of heating element 50 from being closed until a low degree of pressure has been attained.

In operating the apparatus shown in the drawings, bell jar 39 is set in place and the evacuating system placed in operation. While the evacuating system is not part of the self-contained unit, control switches for it are located on panel 12 and it is only necessary to connect the electrical leads 75 from the pumping system to terminals 77 on control panel 12 in order to adjust the entire apparatus by means of control panel 12.

After the pressure has been reduced, toggle switch 34 is turned to "on" position and motor 80 thereupon actuates rotor 48 and pump 13. Rotor heater switch 36 is turned on and the heat input adjusted by means of autotransformer 28. Distilland is now allowed to enter pump 53 through conduit 55. Pump 13 raises the distilland to T-connection 25 from which it is fed to rotor 48 by feed conduit 27. Distilland which is vaporized on the vaporizing surface of rotor 48 is condensed on the air-cooled surface 43 of bell jar 39 from which it flows by gravity to collecting gutter 45.

Undistilled residue from the vaporizing surface of rotor 48 is picked up by gutter 29, and passed through gutters 31 and 33 to receptacle 19. During the starting period ball 21 is usually held up so that receptacle 19 empties into sump 53, but as soon as the apparatus is properly adjusted, ball 21 is lowered by means of pull-up means 23 and receptacle 19 then starts to fill.

Although features of the apparatus are applicable generally to centrifugal vacuum stills, the particular unit shown and described is especially adapted for small scale use in the laboratory. With a 5" rotor the apparatus weighs less than one hundred pounds and is thus easily portable.

While the invention has been described in considerable detail with reference to certain structures, procedures, and materials, it will be understood that modifications and variations therein may be effected without departing from the spirit and scope of the invention as it is defined by the appended claims.

What I claim is:

1. Vacuum distillation apparatus comprising a self-contained portable unit adapted to be readily moved from place to place, said unit comprising an up-standing column, a supporting member projecting laterally outward from said column at an elevated position and having a lower face formed to provide a wall of a vacuum chamber, a jar-like member of elongated configuration arranged in depending relation to said supporting member with the mouth of said jar-like member in sealing engagement with said face and forming a gas-tight vacuum chamber therewith, conduit means communicating with said chamber through said wall and being adapted to be connected with vacuum producing apparatus for evacuating said chamber, a conical disk-shaped vaporizing member, means depending from said wall and rotatably supporting said vaporizing member within said vacuum chamber with the vaporizing surface of said member disposed adjacent a side wall portion of said jar and being separated therefrom by substantially unobstructed space, a motor mounted outside said chamber on said supporting member, power transmitting means extending through said wall and operably connecting said motor and said vaporizing member for rotating said member, electrical heating means associated with said disk-shaped vaporizing member for heating the surface thereof to distilling temperatures, said jar-like member providing a reservoir for liquid distilland at the bottom thereof, a pump and communicating conduit means carried by said supporting member and arranged within said vacuum chamber to transfer distilland from said reservoir to said vaporizing member, said side wall portion of said jar-like member opposite said vaporizing surface being outwardly deformed and providing an air cooled condensing surface, said side wall adjacent a lower portion of said condensing surface being provided with condensate-collecting and discharging means, and control devices carried on said up-standing column including controls for said motor, controls for said vacuum producing means, controls for said heating means and an instrument adapted to indicate the degree of vacuum within said chamber.

2. Vacuum distillation apparatus comprising wall means forming a vacuum chamber, said wall means comprising generally tubular side wall means, a generally concave closed lower end portion integrated with said side wall means and forming with said side wall means a generally jar-like member, and removable plate means closing the mouth of said jar-like member and being arranged in sealing engagement therewith, said closed lower end portion providing a reservoir for distilland, a localized portion of said side wall means being outwardly deformed and providing a condensing surface within said chamber, a rotatable conical disk-shaped vaporizing member mounted within said chamber in distilling relation to said condensing surface, heating means including an electrical resistance heating element enclosed within said rotatable vaporizing member and arranged to rotate with said vaporizing member and means for energizing said element, means for evacuating said chamber, means for driving said vaporizing member, liquid-conveying means arranged wholly within said chamber and extending from said reservoir to said vaporizing member for progressively transferring distilland from said reservoir to said vaporizing member, and residue-collecting means associated with said vaporizing member arranged to collect undistilled residue after passage along said vaporizing member.

3. Vacuum distillation apparatus comprising an up-standing column, a supporting member projecting laterally outward from said column at an elevated position and having a lower face formed to provide a wall of a vacuum chamber, a bell jar arranged in depending relation to said supporting member and having the mouth of said bell jar in sealing engagement with said lower face and forming a gas-tight chamber therewith, said bell jar comprising a side wall merging downwardly with a generally concave closed end, said closed end forming a reservoir for distilland, a localized portion of said closed end being recessed below the remainder of said closed end and forming a distilland-collecting sump, a side wall portion being outwardly deformed and providing a condensing surface, a rotatable generally plate-like vaporizing member in said chamber and being supported from said supporting member, said vaporizing member being disposed with the vaporizing surface opposed to said condensing surface, pump and conduit means within said chamber and arranged to progressively convey distilland from said sump onto said vaporizing member, means for collecting and removing condensate from said condensing surface, means for driving said vaporizing member and said pump, and means for evacuating said chamber.

4. Vacuum distillation apparatus comprising a vertically disposed generally tubular member having a concave closed lower end and an open upper end, said concave closed lower end forming a reservoir for distilland, plate means closing the upper end of said tubular member, said plate means and said tubular member combining to form a vacuum chamber, means for evacuating said vacuum chamber, a conical disk-shaped vaporizing member, means depending from said plate means and rotatably supporting said vaporizing member within said vacuum chamber with the vaporizing surface of said vaporizing member disposed adjacent an upper wall portion of said tubular member and being separated from said upper wall portion by substantially unobstructed space, means for rotating said vaporizing member, said upper wall portion of said generally tubular member opposite said vaporizing surface being outwardly deformed and providing a condensing surface, the lower edge of said condensing surface being formed into a condensate-collecting gutter, and pump and conduit means within said vacuum chamber and extending from said reservoir to said vaporizing member for progressively transferring distilland from said reservoir to said vaporizing member.

5. Vacuum distillation apparatus comprising wall means forming a vacuum chamber, said wall means comprising generally tubular side wall means, a generally concave closed lower end portion integrated with said side wall means and forming with said side wall means a generally jar-like member, and removable plate means closing the mouth of said jar-like member and being arranged in sealing relation therewith, said closed lower end portion providing a reservoir for distilland, a localized portion of said side wall means being outwardly deformed and forming a condensing surface within said chamber, a lower portion of said condensing surface forming a condensate-collecting gutter, a conical disk-shaped vaporizing member disposed within said chamber in distilling relation to said condensing surface, means for rotatably mounting said vaporizing member in dependent relation to said plate means, means for evacuating said chamber, heating means for said vaporizing member, means for rotating said vaporizing member, pumping and communicating conduit means within said chamber and extending from said reservoir for distilland to said vaporizing member for progressively transferring distilland from said reservoir to said vaporizing member, annular gutter means arranged about the periphery of said vaporizing member for collecting undistilled residue from said vaporizing member, and container means arranged to receive residue from said annular gutter means.

KENNETH C. D. HICKMAN.

REFERENCES CITED

The following references are of record in the file of this patent:

UNITED STATES PATENTS

| Number | Name | Date |
|---|---|---|
| 2,117,802 | Hickman | May 17, 1938 |
| 2,234,166 | Hickman | Mar. 11, 1941 |
| 2,298,377 | Hickman | Oct. 13, 1942 |
| 2,313,175 | Scott et al. | Mar. 9, 1943 |
| 2,343,666 | Hickman | Mar. 7, 1944 |
| 2,343,667 | Hickman | Mar. 7, 1944 |

FOREIGN PATENTS

| Number | Country | Date |
|---|---|---|
| 434,726 | Great Britain | Sept. 9, 1935 |